United States Patent [19]
Jarvis et al.

[11] Patent Number: 5,412,709
[45] Date of Patent: May 2, 1995

[54] DIGITAL TELEPHONE STATION LINE CONTROLLER

[75] Inventors: J. Michael Jarvis, Richmond; Andrew F. Bass, Vienna, both of Va.; Gregory R. S. Ilg, Raleigh, N.C.

[73] Assignee: Charter Leasing Corporation, Richmond, Va.

[21] Appl. No.: 903,319

[22] Filed: Jun. 24, 1992

[51] Int. Cl.⁶ .................. H04M 3/22; H04M 3/42; H04J 1/16
[52] U.S. Cl. ........................ 379/28; 379/29; 379/210; 370/13
[58] Field of Search ............ 379/32, 34, 33, 4, 5, 379/10, 29, 27, 28, 210; 370/13, 14, 15

[56] References Cited

U.S. PATENT DOCUMENTS

| | | | |
|---|---|---|---|
| Re. 31,789 | 1/1985 | Hashimoto | 379/142 |
| 3,840,706 | 10/1974 | Krasin et al. | 370/13 |
| 3,946,158 | 3/1976 | Leclercq et al. | 348/14 |
| 4,046,964 | 9/1977 | Daugherty et al. | 370/14 |
| 4,068,104 | 1/1978 | Werth et al. | 379/33 |
| 4,071,699 | 1/1978 | Jovic et al. | 379/142 |
| 4,320,258 | 3/1982 | McDonald | 379/201 |
| 4,381,427 | 4/1983 | Cheal et al. | 370/77 |
| 4,408,325 | 10/1983 | Grover | 370/119 |
| 4,439,639 | 3/1984 | Munter | 379/386 |
| 4,582,956 | 4/1986 | Doughty | 379/142 |
| 4,672,660 | 6/1987 | Curtin | 379/88 |
| 4,821,256 | 4/1989 | Schmidt et al. | 370/13 |
| 4,853,955 | 8/1989 | Thorn et al. | 379/230 |
| 4,873,719 | 10/1989 | Reese | 379/215 |
| 4,885,769 | 12/1989 | Beierle | 379/210 |
| 4,901,344 | 2/1990 | Monette et al. | 379/93 |
| 4,924,492 | 5/1990 | Gitlin et al. | 379/93 |
| 4,937,850 | 6/1990 | Borbas et al. | 379/6 |
| 4,964,112 | 10/1990 | Appelmann | 370/13 |
| 4,995,075 | 2/1991 | Angiolillo-Bent et al. | 379/142 |
| 4,998,240 | 3/1991 | Williams | 370/17 |
| 5,027,341 | 6/1991 | Jarvis et al. | 370/13 |
| 5,027,343 | 6/1991 | Chan et al. | 370/17 |
| 5,029,333 | 7/1991 | Graves et al. | 370/58.1 |
| 5,034,948 | 7/1991 | Mizutani et al. | 370/79 |
| 5,099,480 | 3/1992 | Murata | 371/20.4 |
| 5,111,497 | 5/1992 | Bliven et al. | 379/27 |
| 5,200,996 | 4/1993 | Beierle | 379/212 |

Primary Examiner—Stephen Chin
Assistant Examiner—Kevin Kim
Attorney, Agent, or Firm—Staas & Halsey

[57] ABSTRACT

A digital station line controller is connected via a digital link, such as a T1 span, to the line side of a central office and via digital station line loops to digital terminal devices, such as telephones. The station line controller interprets certain signals used by a conventional protocol, such as TR8, between a central office and a remote terminal, as status requests. In response to the status requests, the station line controller provides status information obtained by monitoring the terminal devices connected thereto and the station line controller itself. The status information may be obtained by generating codes which perform tests of the terminal devices and the station line controller. In addition, non-voice information transmitted over a subscriber channel in the on-hook, no-ring state of the subscriber channel is decoded and used or output by the station line controller to a corresponding terminal device or auxiliary equipment.

5 Claims, 3 Drawing Sheets

DIGITAL TELEPHONE STATION LINE CONTROLLER

BACKGROUND OF THE INVENTION

1. Field of the Invention

The present invention is directed to digital telecommunications and, more particularly, communications between a plurality of terminal devices, such as digital telephones, and a central office of the public switched telephone network.

2. Description of the Related Art

Digital transmission of both voice and data is used extensively in the public switched telephone networks (PSTNs) worldwide. In North America, most systems transmit at a basic rate of 1.544 million bits per second (Mbps) or a multiple thereof. Elsewhere in the world, 2.048 Mbps is widely used as the basic rate. These rates are common due to international standardization and the availability of electronics for switching, multiplexing, encoding and decoding at these rates.

The transmission media used for digital telecommunication include twisted-pair wires, microwaves and optical fibers. Two sets of twisted-pair wires are used for full-duplex transmission and full-duplex microwave transmission uses two frequency pairs. A single optical fiber may be used for full-duplex transmission at the basic rate and at much higher rates, e.g., 90 or 180 Mbps.

In addition to differences in the rate of transmission, several different transmission protocols are used throughout the world. At the present time in North America, T1 spans using the extended superframe (ESF) protocol connect many of the central office switches in the PSTN. The superframe (SF) protocol is currently more common between the PSTN and digital private branch exchanges (PBXs), but ESF is available for these links which are discussed below in more detail. The Consultative Committee for International Telephone and Telegraph (CCITT) has several digital protocols. The G.700 Series known as E1 or CEPT-1 multiplexes thirty 8-bit subscriber channels with an 8-bit synchronization and alarm channel and an 8-bit signalling channel for a total of thirty-two channels transmitted together at 2.048 Mbps. The Integrated Services Digital Network (ISDN) transmission protocol is used for transmission between ISDN network terminal interfaces (NTIs) over a PSTN and is transmitted inside a protocol like T1 or E1.

Although digital lines are commonly used between central office switches and digital telephones are available from many sources (without standardization), there is relatively little use of all digital transmission from telephone to telephone via the PSTN. The vast majority of residences and many businesses, particularly those smaller in size, use analog telephones which may be connected to a remote terminal that performs analog/digital conversion for telephones and communicates to a central office in the PSTN via a digital line, such as a T1 span in the U.S. Digital PBXs are commonly used to connect digital telephones to the PSTN. However, PBXs typically operate at a multiple of a 12 KHz voice data transmission rate and use proprietary signalling protocols. As a result, digital PBXs buffer signals between digital telephones and the PSTN to perform timing and protocol conversions.

Furthermore, most central office switches in North America provide a predetermined number of embedded derived carrier systems, e.g., sixty-four SLC®96s, but do not provide an inherent ability to connect to PBXs, in part because the requirements of PBXs can vary. In addition, due to the buffering and signalling conversion described above, conventional PBXs cannot easily be connected to a SLC®96 which includes derived data link (DDL) signalling information, i.e., maintenance, alarm, and in mode 2 concentration routing, on only one of the four T1 spans used to transmit voice signals. As a result, conventional PBXs are typically connected to central office switches in the PSTN using additional equipment in the central office to provide digital trunk connections, or using analog line connections and analog/digital converters for digital PBXs.

A station line controller as disclosed in U.S. Pat. No. 5,027,341, incorporated by reference herein, enables digital telephones to be connected via a multiplexed digital channel to a central office in the PSTN without any digital/analog conversion and without using a remote terminal. A standard subscriber carrier system like SLC®96 may be used to provide four T1 spans plus one spare T1 span. The T1 spans provided by an SLC®96 will be referred to as A, B, C and D links to distinguish from the twenty-four subscriber channels on each link, although Conventionally they are usually referred to as A-D channels. U.S. Pat. No. 5,027,341 discloses that four station line controllers, each connected to up to 24 telephones, can be linked together to transfer the switching information for the SLC®96 which is transmitted only over the A link and to permit transfers of calls between any of the up to 96 telephones connected to the station controllers.

However, there are many uses for the station line controller disclosed in U.S. Pat. No. 5,027,341 which are not suggested therein. No other known device is capable of connecting digital telephones to the line side of a central office in the PSTN. Digital PBXs like all PBXs are connected to the trunk side of a central office. As a result, no other known device is able to take advantage of existing signalling on digital subscriber channels.

SUMMARY OF THE INVENTION

An object of the present invention is to provide connections between digital telephones and the line side of a central office using conventional digital subscriber channels.

Another object of the present invention is to use conventional digital signalling on subscriber channels between a central office and telephones to report on equipment status.

Yet another object of the present invention is to transmit data on a subscriber carrier system between a central office and customer premises equipment during an on-hook, no-ring state of a subscriber channel.

The above objects are attained by providing a station line controller for digital terminal devices connected to a multiplexed digital channel of a public switched telephone network, comprising a carrier line interface connected to the multiplexed digital channel of the public switched telephone network; at least one terminal device interface, each connected to one of the digital terminal devices; and a processing unit, operatively connected to the carrier line interface and the at least one terminal device interface, for monitoring the terminal device to obtain status information and reporting the status information to the public switched telephone network.

Each terminal device interface is connected to a corresponding digital terminal device via a digital telephone station loop. The processing unit includes at least one processor which generates test signals to test predetermined operations of each terminal device connected to the station line controller. In addition, this processor monitors the operation of the station line controller itself. The results of both kinds of monitoring are used to produce status information which is transmitted to the PSTN in response to status requests therefrom. In addition, the processor causes the output of alarm signals to the PSTN upon detection of significant equipment failure. Preferably, another processor controls encoding of all output to the PSTN and decoding of all signals received therefrom.

In addition, the processing unit may be used to transmit and receive data using the subscriber data transmission bits in a subscriber channel for a terminal device in an on-hook, no-ring state. The data may be used in the station line controller or routed to another device, either associated with the terminal device, or unrelated thereto.

These objects, together with other objects and advantages which will be subsequently apparent, reside in the details of construction and operation more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
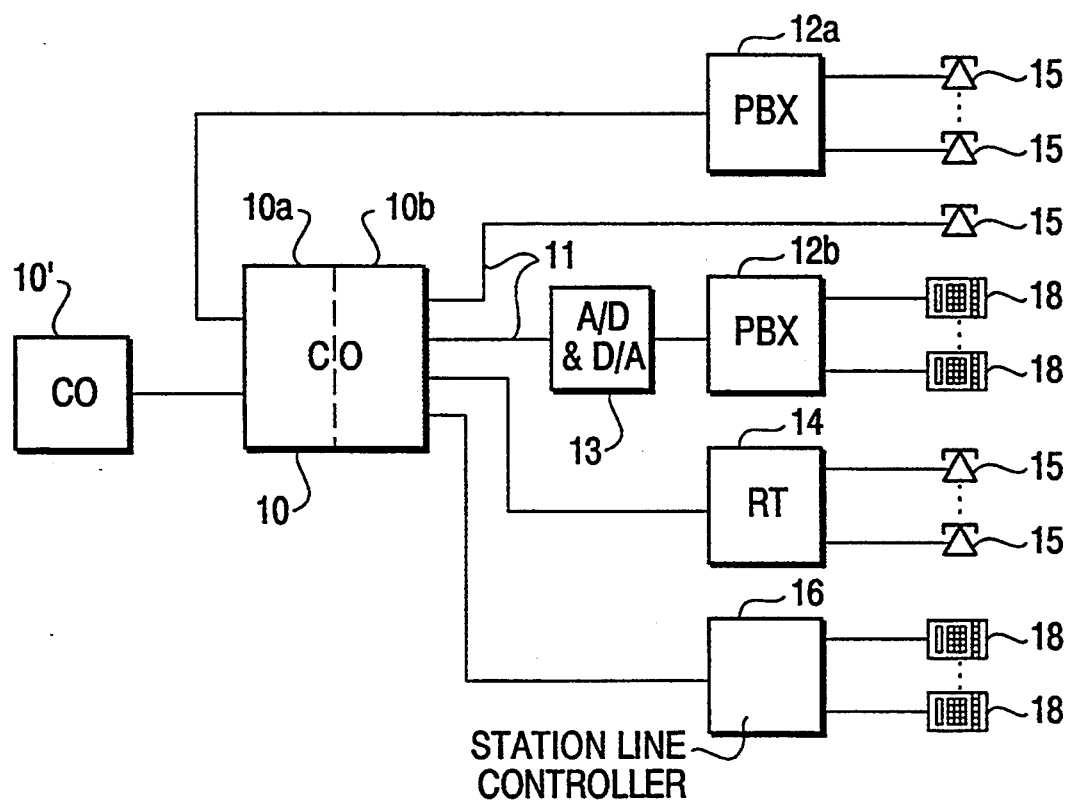
FIG. 1 is a block diagram of a portion of the public switched telephone network connected to a station line controller according to the present invention.

As illustrated in FIG. 1, a central office switch 10 can be connected to other switches 10' via trunk connections on what is referred to as the trunk side 10a and to customer premises equipment (CPE) via line connections on the line side 10b. In addition to other central office switches 10' PBXs such as PBX 2a, may also be connected to the trunk side 10a. Alternatively, PBXs, like PBX 12b, may be connected via twisted pairs of wires 11 to analog line connections on the line side 10b, using an analog/digital converter 13 for digital PBXs. Similarly, conventional analog telephones 15 may be connected via twisted pairs of wires 11 to the line side 10b. In addition, a remote terminal (RT) 14 may connect analog telephones 15 to the line side 10b via either an analog line, or a digital line using the TR-TSY-000008 (TR8) or TR-TSY-000303 (TR303) protocol. When the RT 14 is connected to the CO 10 via a digital line, the RT 14 performs digital/analog conversion. There is no known use of remote terminals to connect to digital telephones via a digital line. Only a digital station line controller 16, as described in U.S. Pat. No. 5,027,341, permits all-digital communication between digital telephones 18 and a CO 10.

As known in the art, all digital telephone transmission protocols have some provision for supervisory and signalling information. In the E1 protocol, of the thirty-two time slots (each corresponding to an 8-bit channel), time slot 0 is used for synchronization and alarms and time slot 16 is used for signalling. In the T1 protocol using ESF, the framing (193rd) bit is "stolen" to provide 4000 bps for similar purposes. In addition, in every sixth frame the least significant bit of each channel is "stolen" for signalling and routing information. The bits stolen from every sixth frame of a channel are referred to as the A and B bits. The stolen bit in the sixth frame is referred to as the A bit and the stolen bit in the twelfth frame is referred to as the B bit. A signalling protocol is used to transmit information via the A and B bits, such as on-hook/off-hook from a terminal device, e.g., as a telephone, to the PSTN and ring/no-ring from the PSTN to the terminal device. The A and B bits are transmitted at a total rate of 1333 bps on each subscriber channel. However, each channel transmits data at 64 thousand bps (kbps) or 62.7 kbps when the stolen bits are taken into account. The present invention supports the full use of the signalling and maintenance information transmitted in the T1 protocol, but can also transmit data at 62.7 kbps at any time, using the subscriber data transmission bits in an 8-bit subscriber channel.

Figure 2:
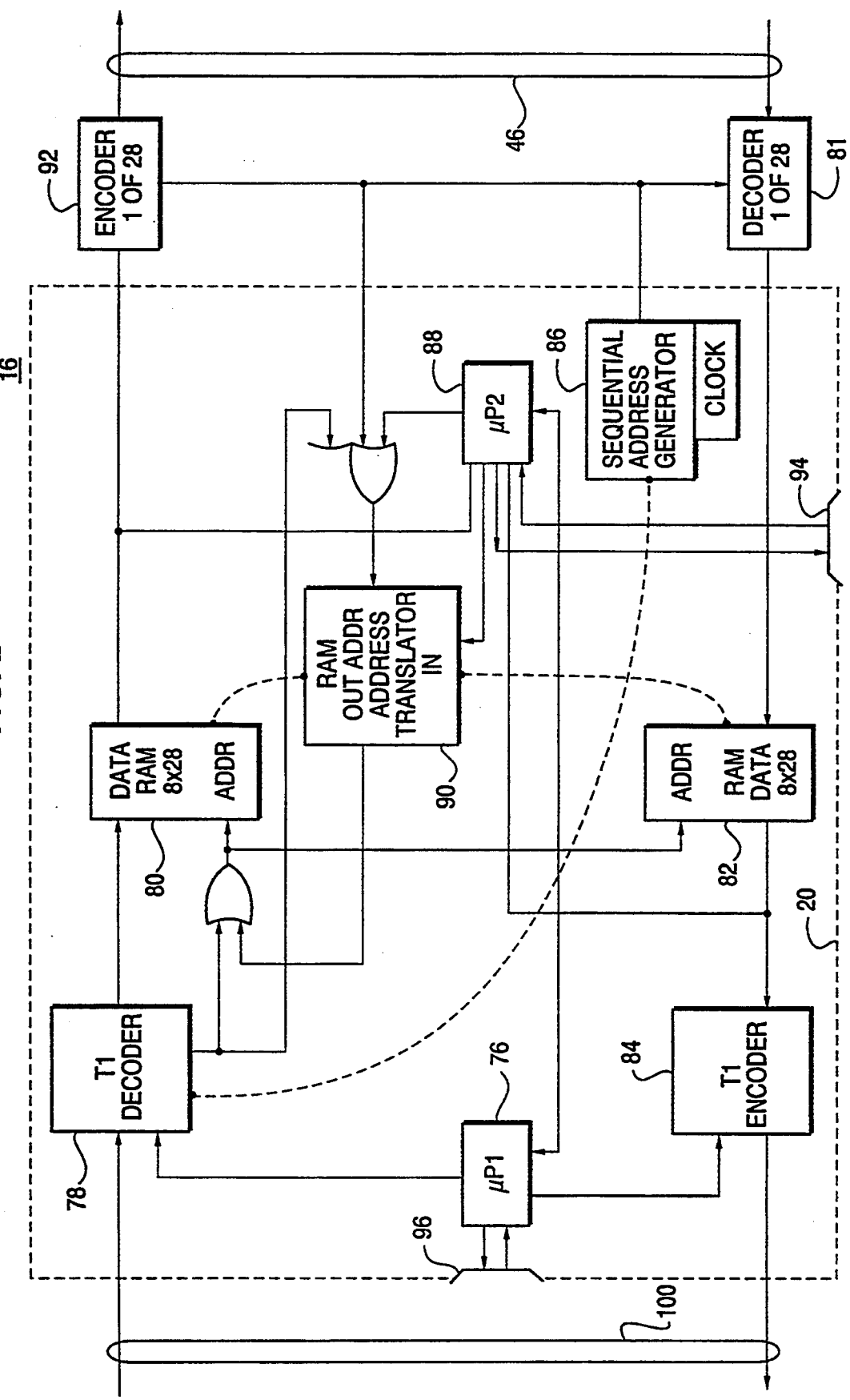
FIG. 2 is a block diagram of a station line controller according to the present invention.

As illustrated in FIG. 2, a station line controller 16 according to the present invention may be constructed as described in U.S. Pat. No. 5,027,341. The T1 encoder 78 and decoder 84 may each be provided by any conventional channel service unit/data service unit (CSU/DSU), available on a single integrated chip, such as a CS2180 from CRYSTAL SEMICONDUCTOR of Austin, Tex. Each CS2180 can perform encoding/decoding for a T1 span with twenty-four channels and thus, the encoder 78 and decoder 84 represent functional blocks of a carrier line interface in the station line controller 16, not physical chips.

Figure 3:
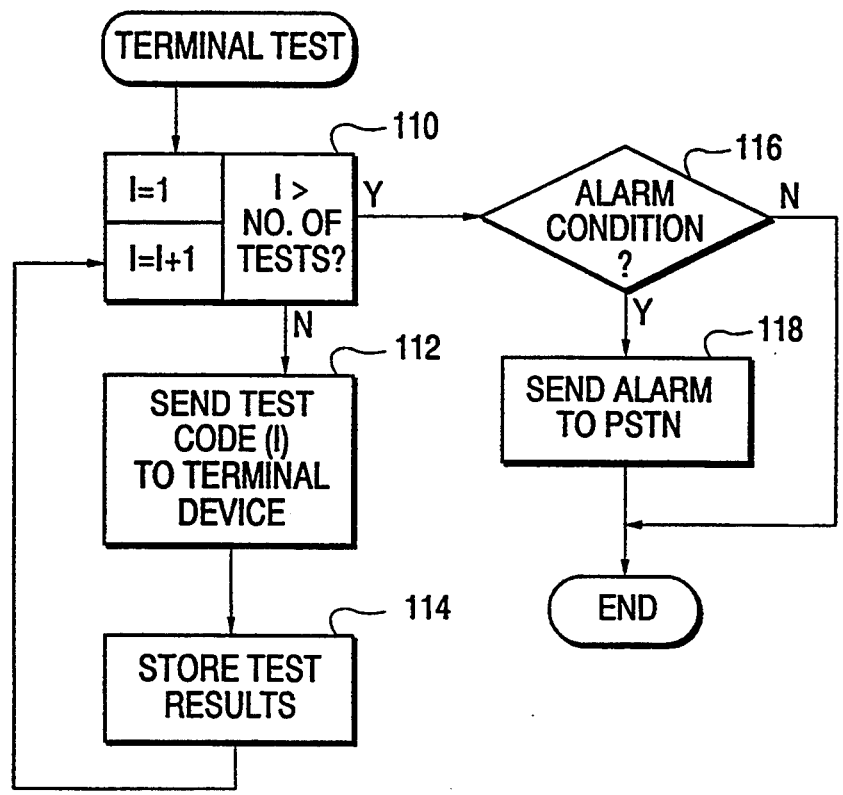
FIGS. 3 and 4 are flowcharts of a testing method according to the present invention.

The embodiment illustrated in FIG. 3 has 28 terminal device interfaces, each including an encoder 92 and a decoder 81. The encoder 92 and decoder 81 may be provided by field-programmable logic gate arrays, such as a XC3090 from XILINX of San Jose, Calif., each of which can provide circuits for several, e.g., ten, encoders 92 or decoders 81. The terminal device interfaces illustrated in FIG. 2 provide four extra interfaces beyond a 1:1 correspondence between subscriber channels and digital telephone station loops, so that more than one terminal device may be connected to a single subscriber channel. Additional terminal device interfaces 81, 92 could be provided if there is a demand for many subscriber channels to be connected to multiple terminal devices. For example, a single subscriber channel may be connected by the station line controller 16 to more than one digital telephone 18, or a digital telephone and a data communication device, such as a personal computer or facsimile machine, may be connected to the station line controller 16 via separate station line loops 46. By separately connecting the terminal devices, one terminal device may be connected by the station line controller 16 to the corresponding subscriber channel while the other terminal device may be used in an intercom mode of the station line controller 16 to communicate with another terminal device connected to the station line controller 16.

The remainder of the station line controller 16 which will be referred as the processing unit, includes memory and at least one processor. The embodiment illustrated in FIG. 2 includes a processor 76, such as a TMS370C250S from TEXAS INSTRUMENTS, which controls operation of the carrier line interface (CSU/DSU) 78, 84 and another processor 88, which may also be a TMS370C250S, that controls the terminal device interfaces and monitoring operations. The RAM 90 is used for address translation to direct signals between each channel of the T1 span 100 and the corresponding terminal device, e.g., digital telephone 18. In addition, the RAM 90 or a separate memory unit (not shown) may be used to store representations of signals received from the terminal devices to provide status information on the terminal devices to the PSTN and information from the PSTN for the terminal devices.

As noted above, conventionally SLC®96s are used to connect an RT 14 to a central office 10 using a TR8 or TR303 protocol. The TR8 and TR303 protocols include testing codes for testing RTs and additional tests using a bypass pair, typically sending analog signals, are also performed. When a SLC®96 is connected to a station line controller 16 according to the present invention, the codes used to test an RT are preferably interpreted as requests for status information. When such a request is decoded by the processor 88, status information corresponding to the requested information is transmitted to the PSTN by the processor 88 via the carrier line interface 78, 84 using codes defined by, e.g., the TR8 protocol. The central office, test desk, etc. which generates the status request preferably has configuration information stored therein identifying the T1 span 100 as being connected to a station line controller, not an RT. As a result, although the same testing protocol is used for both an RT and a station line controller according to the present invention, both the status requestor and the status informer treat the codes transmitted via the protocol differently for an RT and a station line controller.

In the preferred embodiment, the status information supplied to the PSTN is generated using the procedure illustrated in FIG. 3. A master program periodically executes a loop 110 to send 112 a series of test codes to a terminal device, like digital telephone 18. The terminal device is programmed to respond to codes received over the digital station line loop by performing self tests and outputting signals. Representations of the test results are stored 114, e.g., in RAM 90. This process is repeated for as many tests as desired. If an alarm condition is represented 116 in the test results, an alarm signal or code is sent 118 to the PSTN. The master control program executes the procedure illustrated in FIG. 3 periodically for all of the terminal devices connected to the station line controller.

Figure 4:
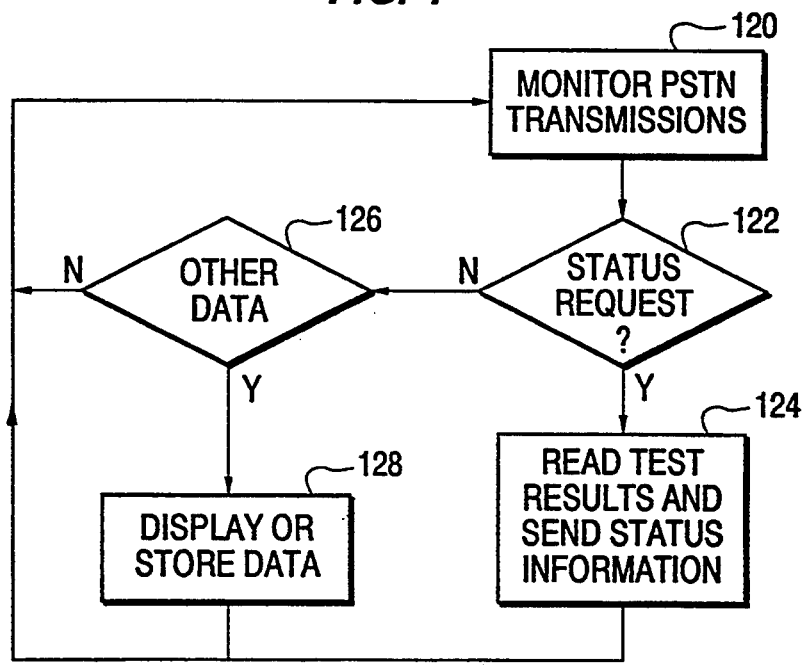

As illustrated in FIG. 4, in the preferred embodiment, the processor 88 monitors 120 the transmissions from the PSTN. When a status request is decoded 122, the test results are read 124 from the memory unit, e.g., RAM 90, and the requested status information is sent to the PSTN. In addition to sending status information on the terminal devices, the station line controller may perform self tests, e.g., under the control of the processor 88, and send the results to the PSTN in response to an appropriate request. Alternatively, instead of performing the tests periodically, one or more of the tests may be performed only after receiving and decoding a status request from the PSTN.

An unexhaustive list of the tests which may be performed of the terminal devices include testing the keyboard encoder, any lamps or other displays on the terminal device, the switchook, power supply and operation of the CODECs. The memory of a terminal device could also be tested for abbreviated dialing and other functions. Also, any interfaces to associated equipment, such as a visual display may be checked.

In addition, the speaker on the handset, a headset or a loudspeaker may be tested. One way of testing speaker operation is to check the volume control byte (or word). The status information could note that the volume control byte indicates that signals sent to the phone are being amplified more than expected for a particular telephone. Different telephones may be treated differently on an historical basis or by identifying telephones used by hearing impaired individuals.

The station line controller 16 illustrated in FIG. 2 may also be used to perform other operations which are not disclosed in U.S. Pat. No. 5,027,341. For example, as illustrated in FIG. 4, if a status request is not detected 122, but non-voice information, i.e., data, is being transmitted 126 over a subscriber line channel, the data may be displayed or stored 128. Since the channels are monitored at all times, data may be transmitted using the subscriber data transmission bits when the subscriber channel is in the on-hook, no-ring state.

At the present time, information, such as that commonly known as caller ID, is transmitted during the silent period between rings. When using analog lines, modems or codecs meeting the Bell 202C standard are used to transmit a burst of information during the silent period. For an all-digital connection between the central office and a telephone or other display device, such as that provided by a station line controller according to the present invention, no codecs are required to receive data transmitted in this conventional manner. As a result of using digital transmission only, a station line controller according to the present invention enables caller ID and similar information to be displayed at a telephone more quickly, more accurately, and at less expense for this additional service, than the method used today for analog telephones.

Furthermore, the decoder 78 in the carrier line interface can supply information received at any time over a subscriber channel to the RAM 80 where it can be accessed by microprocessor 88. The microprocessor 88 then outputs data signals based upon the non-voice information received while the subscriber channel is in an on-hook, no-ring state. The data signals may be output to a memory unit in the station line controller, such as RAM 90 or a separate memory unit. For example, configuration information from the central office defining the services provided to a subscriber may be obtained and stored in this manner.

Data signals derived from the non-voice information may also be output via the encoder 92 in the terminal device interface to the terminal device(s) corresponding to the subscriber channel. As known in the art, digital telephones and other terminal devices typically include an integral display, commonly formed by a liquid crystal display (LCD) and memory for frequently called numbers, etc. The data signals transmitted from the station line controller 16 may be displayed on the integral display unit in the manner of caller ID information, or stored in the memory to provide configuration data at the terminal device. The processor 88 may include in the data signals instructions to the terminal device on how to handle the data received as non-voice information transmitted over the subscriber line channel.

The station line controller 16 may also output the data signals to a separate device, either connected via one of the extra station line loops 46, or via a separate data interface 94. The data interface 94 may be an industry standard interface, such as RS-232C, IEEE-411, etc. A display device which may be associated with one of the terminal devices may be connected via either interface. In addition, a personal computer or other data processing device could be connected via either interface. In U.S. Pat. No. 5,027,341 the data interface 94 was used to connect two other station line controllers via a local area network (LAN) Other data processing device(s) could be connected to the LAN, or separate data interfaces could be provided for other station line controllers and data processing devices.

The many features and advantages of the present invention are apparent from the detailed specification, and thus it is intended by the appended claims to cover all such features and advantages of the apparatus and method which fall within the true spirit and scope of the invention. Further, since numerous modifications and changes will readily occur to those skilled in the art from the disclosure of this invention, it is not desired to limit the invention to the exact construction and operation illustrated and described. Accordingly, suitable modifications and equivalents may be resorted to, as falling within the scope and spirit of the invention.

What is claimed is:

1. A method of testing terminal devices connected to a public switched telephone network including a central office, comprising the steps of:
    (a) monitoring at least one terminal device to obtain status information, said monitoring including the steps of:
        (a1) monitoring by a station line controller operation of the station line controller operatively connected to the central office via a digital subscriber carrier system and to each of the at least one terminal device via a digital telephone station loop; and
        (a2) periodically verifying predetermined operations of each of the at least one terminal device using the station line controller;
    (b) receiving status request signals from the public switched telephone network; and
    (c) reporting the status information from the station line controller to the public switched telephone network in response to the status request signals received in step (b).

2. A method as recited in claim 1, wherein said reporting of the status information in step (c) includes reporting on the predetermined operations of the at least one terminal device and the operation of the station line controller.

3. A method as recited in claim 2,
    wherein said requesting in step (b) uses a protocol for a remote terminal connected to a central office via more than three subscriber line channels, and
    wherein said reporting in step (c) uses the protocol of step (b).

4. A station line controller for digital terminal devices connected to a multiplexed digital channel of a public switched telephone network, comprising:
    a carrier line interface connected to the mmultiplexed digital channel of the public switched telephone network to receive a request signal from the public switched telephone network requesting status information;
    at least one terminal device interface, each connected to one of the digital terminal devices via a digital station line loop to receive electronic signals therefrom;
    a memory unit; and
    a processing unit, operatively connected to said memory unit, said carrier line interface and said at least one terminal device interface, for monitoring at least one of the digital terminal devices to obtain status information and reporting the status information. to the public switched telephone network, by periodically generating a first code directed to the digital terminal devices, processing and storing in said memory unit, representations of the signals received by said at least one terminal device interface from the at least one of the digital terminal devices in response to the first code and generating a second code output via said carrier line interface to the public switched telephone network in response to the request signal received by said carrier line interface, using the representations stored in said memory unit.

5. A station line controller for digital terminal devices connected to a multiplexed digital channel of a public switched telephone network, comprising:
    a carrier line interface, connected to the multiplexed digital channel of the public switched telephone network, to decode signals received from the public switched telephone network to produce received network data and produces signals for transmission to the public switched telephone network by encoding station line data;
    at least one terminal device interface, each connected to one of the digital terminal devices;
    a processing unit, including
    a first processor, operatively connected to said carrier line interface, to control operation of said carrier line interface, including decoding of status requests from the public switched telephone network and encoding of the status information and alarm signals reporting equipment malfunction without request;
    at least one memory unit, operatively connected to said carrier line and at least one terminal device interface, to store the received network data and the station line data; and
    a second processor, operatively connected to said first processor, said memory unit and said at least one terminal device interface, to control operation of said at least one terminal device interface, including generating test signals to test the predetermined operations of each of the at least one digital terminal device, to control monitoring of said station line controller and to control generation of the status information and alarms included in the station line data.

* * * * *